United States Patent [19]
Valent

[11] Patent Number: 5,867,353
[45] Date of Patent: Feb. 2, 1999

[54] OFF-TRACK PES CALIBRATION FOR A MAGNETO-RESISTIVE ELEMENT

[75] Inventor: James A. Valent, Longmont, Colo.

[73] Assignee: Maxtor Corporation, Longmont, Colo.

[21] Appl. No.: 706,441

[22] Filed: Aug. 30, 1996

Related U.S. Application Data

[63] Continuation of Ser. No. 315,877, Sep. 30, 1994, abandoned.

[51] Int. Cl.⁶ .................................................. G11B 5/596
[52] U.S. Cl. ....................................... 360/135; 360/77.04
[58] Field of Search .................................... 360/131, 135, 360/77.01, 77.02, 77.04, 77.05, 77.07, 77.08, 77.11, 77.14

[56] References Cited

U.S. PATENT DOCUMENTS

| | | | |
|---|---|---|---|
| 5,121,260 | 6/1992 | Asakawa et al. | 36/31 |
| 5,400,201 | 3/1995 | Pederson | 360/135 |
| 5,436,773 | 7/1995 | Hanson | 360/77.08 |
| 5,455,724 | 10/1995 | Suzuki et al. | 360/77.04 |

FOREIGN PATENT DOCUMENTS

| | | |
|---|---|---|
| 267669 | 5/1988 | European Pat. Off. . |
| 361222 | 4/1990 | European Pat. Off. . |
| WO 88/03693 | 5/1988 | WIPO . |
| WO 93/10525 | 5/1993 | WIPO . |

*Primary Examiner*—John H. Wolff
*Assistant Examiner*—George J. Letscher
*Attorney, Agent, or Firm*—Sheridan Ross P.C.

[57] ABSTRACT

A method and apparatus for creating a position error signal (PES) voltage v. track distance curve for the head of a hard disk drive. The disk has a dedicated track which contains a plurality of servo bits that allow the head to be centered with the centerline of the track. The dedicated track also has a number of calibration bits each embedded at a known location off-set from the track centerline. The PES voltage v. track distance curve is generated by reading each calibration bit and storing the corresponding amplitude of the position error signal in a memory device of the disk drive. Each calibration bit is located from the track centerline a distance that is different from the other calibration bits so that there are provided multiple points on the track curve.

24 Claims, 3 Drawing Sheets

OFF-TRACK PES CALIBRATION FOR A MAGNETO-RESISTIVE ELEMENT

This is a continuation of application Ser. No. 08/315,877, filed on Sep. 30, 1994 now abandoned.

BACKGROUND OF THE INVENTION

1. Field of the Invention

The present invention relates to a method for generating a position error signal calibration curve for a read element of a hard disk drive.

2. Description of Related Art

Hard disk drives contain a disk that rotates relative to a head. The head is located at the end of an actuator arm assembly. The actuator assembly includes a voice coil motor which can move the head relative to the surface of the disk. The head contains a transducer which can magnetize and sense the magnetic field of the disk.

Data is stored on the disk within a number of concentric radial tracks. Each track is further divided into a plurality of sectors. To accurately write and read data, it is desirable to maintain the head on the center of the track. To assist in controlling the position of the head, each sector of the disk typically contains a number of servo bits accurately located relative to the centerline of the track. The raw signals produced by the servo bits are typically demodulated into a single position error signal (PES). The electronic circuits of the drive utilize the position error signals to determine the position of the head relative to the track, and to move the actuator arm if the head is not located on the track centerline.

The servo routine of a hard disk drive is typically performed with a position error signal voltage v. track distance curve that is stored within memory of the drive. The voltage v. track distance curve provides a correlation between the amplitude of the position error signal and the distance between the head and the center of the track. For example, a PES signal having an amplitude of approximately ½ of the peak amplitude may provide an indication that the head is a ¼ track width away from the track centerline. In accordance with the track curve, the actuator arm is moved a corresponding distance to center the head. The voltage v. track distance curve is typically based on an ideal curve that is generated from an algorithm stored in the read only memory (ROM) of the drive.

Conventional hard disk drive read/write heads typically have a single transducer that both read and write data onto the disk. Generally speaking, conventional single element heads have reached maximum aerial densities (typically measured in gigabits per square inch). There does exist a dual element head that has been found to provide greater aerial densities than single element transducers. Dual element heads contain a single write element and a separate read element that is constructed from a magneto-resistive material. Such dual element transducers are commonly referred to as magneto-resistive (MR) heads.

Because of manufacturing tolerances, the separate magneto-resistive element may be off-center from the write element of the head. Therefore, if data is written off the center of the track, to read the data, the servo system must move the head slightly off-center so that the read element is centered with the written data. The routine of moving an MR head during a read operation is commonly referred to as micro-jogging.

The head can be moved in accordance with the voltage v. track distance curve stored in memory. It has been found that the voltage v. tack distance curve for a MR head is non-linear in nature and varies greatly between different heads. It would therefore be desirable to provide a method for generating an actual voltage v. track distance for a magneto resistive head.

SUMMARY OF THE INVENTION

The present invention is a method and apparatus for creating a position error signal (PES) voltage v. track distance curve for the head of a hard disk drive. The disk has a dedicated track which contains a plurality of servo bits that allow the head to be centered with the centerline of the track. The dedicated track also has a number of calibration bits each embedded at a known location off-set from the track centerline. The PES voltage v. track distance curve is generated by reading each calibration bit and storing the corresponding amplitude of the position error signal in a memory device of the disk drive. Each calibration bit is located from the track centerline a distance that is different from the other calibration bits so that there are provided multiple points on the track curve.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
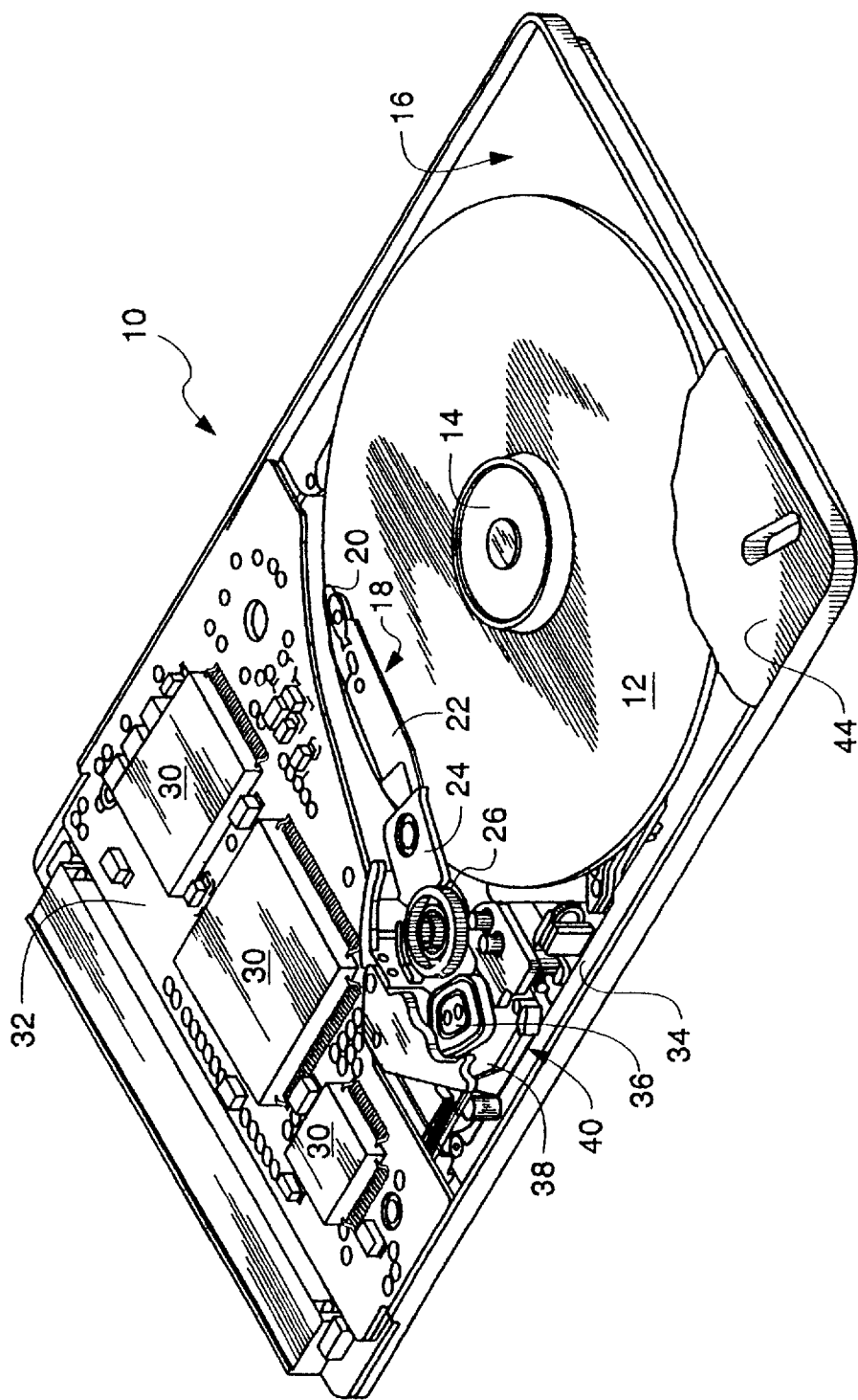
FIG. 1 is a top view of a hard disk drive.

Referring to the drawings more particularly by reference numbers, FIG. 1 shows a hard disk drive 10. The disk drive 10 includes a disk 12 that is rotated by a spin motor 14. The spin motor 14 is mounted to a base plate 16. Also mounted to the base plate 16 is an actuator arm assembly 18. The actuator arm assembly 18 includes a number of heads 20 mounted to corresponding flexure arms 22. The flexure arms 22 are attached to an actuator arm 24 that can rotate about a bearing assembly 26. The assembly 18 also contains a voice coil motor 28 which moves the heads 20 relative to the disk 12. There is typically a single head for each disk surface. The spin motor 14, voice coil motor 28 and the heads 20 are coupled to a number of electronic circuits 30 mounted to a printed circuit board 32. The electronic circuits 30 typically include a read channel chip, a microprocessor based controller and random access memory (RAM) device.

Figure 2:
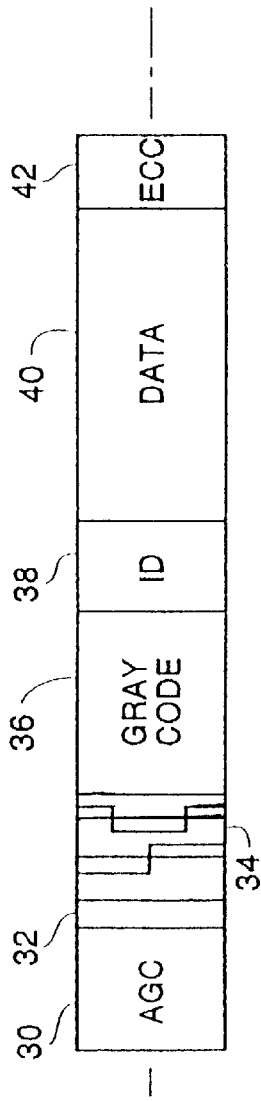
FIG. 2 is a schematic of a conventional data sector of the disk.

As shown in FIG. 2, data is typically stored within sectors of radially concentric tracks located across the disk 12. A typical sector will have an automatic gain control (AGC) field 30, a synchronization (sync) pulse 32, a number of servo bits 34, a gray code field 36 that identifies the track, an identification (ID) field 38 that defines the sector, a data field 40 which contains the data and an error correction code field 42. The electronic circuits 30 utilize the servo bits 34 to maintain the heads 20 on the centerline CL of the track. If the heads 20 are off-center the electronic circuits 30 will generate a position error signal (PES) which has a voltage amplitude that varies with the distance that the heads 20 are off-set from the track centerline.

The heads 20 can magnetize and sense the magnetic field of the disk. In the preferred embodiment, each head 20 has a single write element and a separate read element. The read element is preferably constructed from a magneto-resistive material which changes resistance in proportion to the intensity of an external magnetic field.

Figure 3:
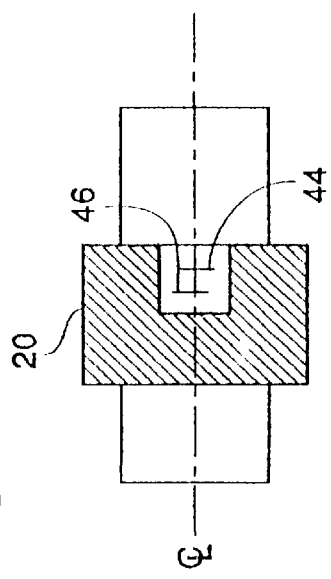
FIG. 3 is a schematic showing a head reading data from a data sector.

As shown in FIG. 3, the read element 44 is sometimes off-set from the write element 46 because of the tolerances associated with the manufacturing process of the head. Because the write element 46 is off-set from the read element 44, the data is written off-center from the center of the track. To properly read the data, the read element 44 must be moved over to the off-center location of the written data.

Figure 4:
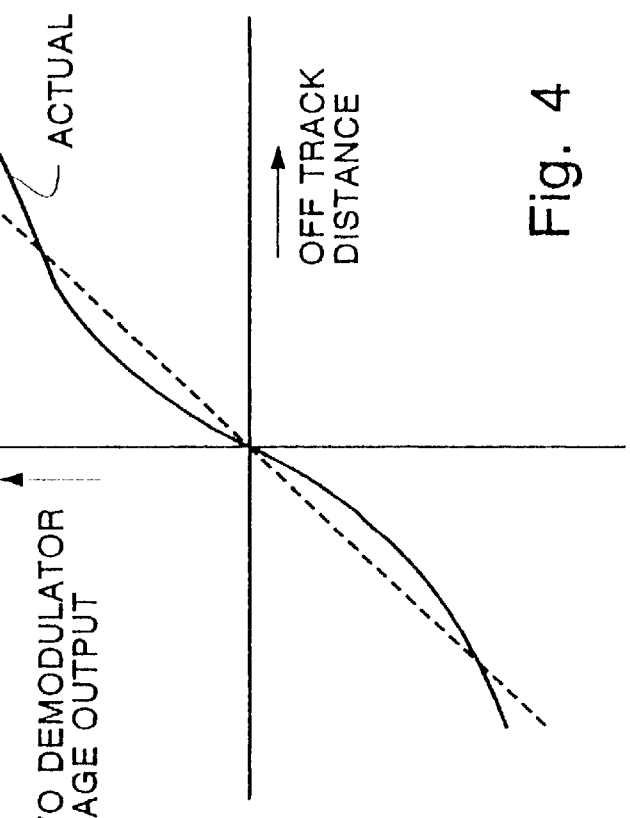
FIG. 4 is a graph showing a PES voltage v. track distance curve.

The heads 20 are moved in accordance with the position error signal voltage v. track distance curve shown in FIG. 4. The off-set distance between the write element 46 and the element 44 for each head is typically calculated when the disk is initially assembled. When both elements are concentric the PES signal should be ideally zero when the read track is centered with the written data. If the read element 44 is off-set from the write element 46 the PES signal is some non-zero value when the read element is centered over the written data. The microprocessor based controller utilizes the curve to determine the position of the heads 20 and the movement required to center the read element 44 with the written data. It has been found that the PES voltage v. track distance curve is typically non-linear for magneto-resistive heads.

Figure 5:
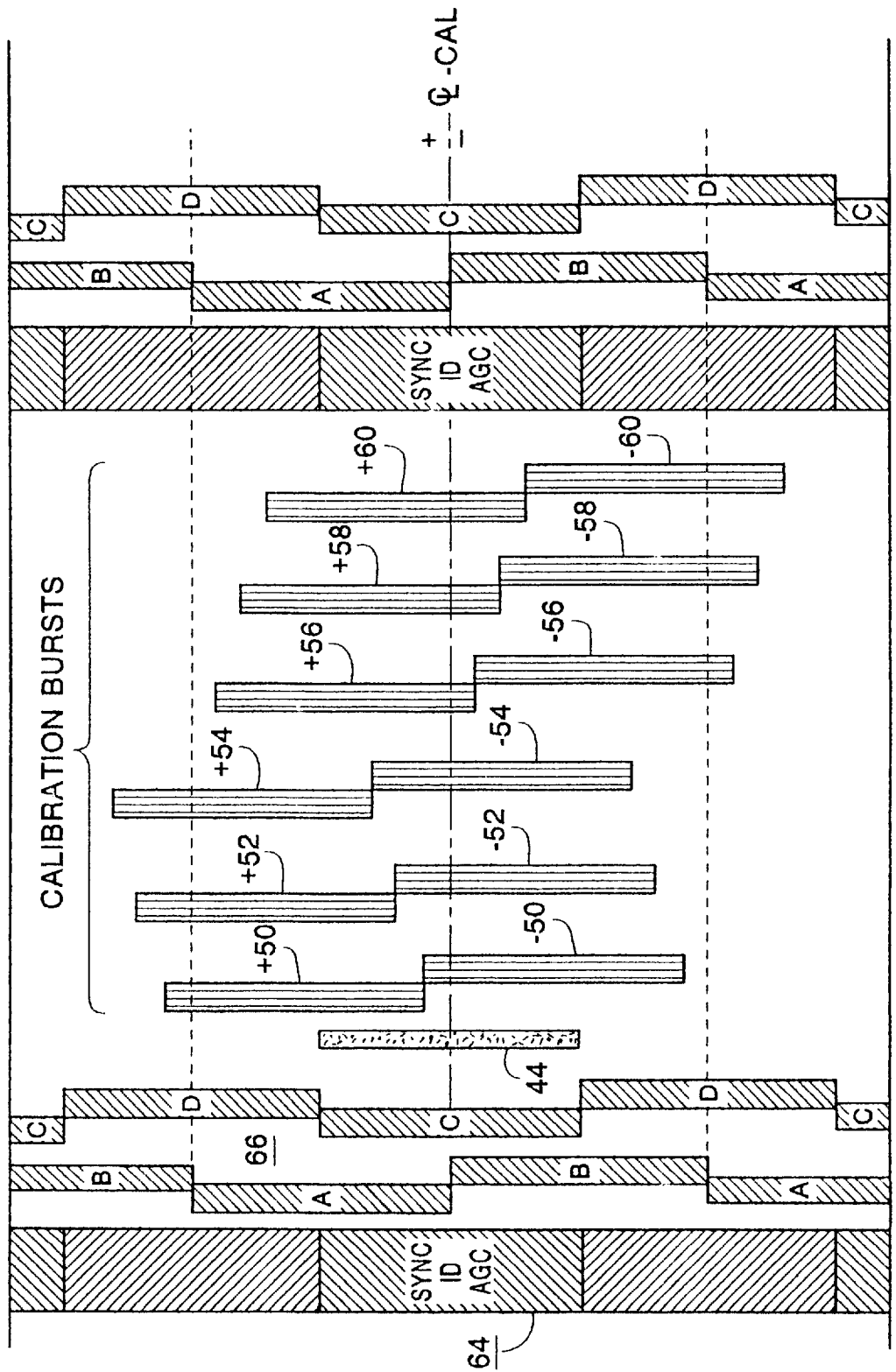
FIG. 5 is a schematic of a dedicated track that contains a number of calibration bits.

FIG. 5 shows a plurality of calibration bits 50–60 that are embedded into the disk 12 and used to create the curve depicted in FIG. 4. The calibration bits 50–60 are typically located in a dedicated calibration track of the disk which has no data. The calibration track has an AGC/ID/SYNC field 64 to provide corresponding functions for the operation of finding, tracking and reading the dedicated track. Although the AGC, ID and SYNC are shown as one field, it is to be understood that these functions can be located within separate fields. It should also be understood that these fields are standard servo fields used in the servo sectors of data carrying tracks of sectored servo disk drives.

The calibration track also contains a number of servo bits 66 designated A, B, C and D. The boundary formed by the A and B servo bits defines the track CL of the servo calibration track. The boundary formed by the C and D servo bits is offset by a distance corresponding to ½ of the track width. The C and D servo bits are not used in the servo signal calibration. The servo bits are detected by the read element 44 of the head and demodulated by the electronics into a single PES signal. The servo bits A and B are used to center the read element 44 with the centerline CL of the dedicated track.

The calibration bits 50–60 each have a centerline located at a predetermined off-set position from the track centerline CL. The calibration bits are typically embedded with the servo bits during the assembly process of the disk drive with instrumentation that accurately controls the location of the bits. The boundary of the first set of calibration bits +50 and −50 defines a centerline that is located at a predetermined distance +d1 from the track centerline CL. The calibrations bit sets ±52 and ±54 define servo bit centerlines that are located distances of +d2 and +d3 from the track centerline, respectively. Likewise the calibration bit sets ±56–60 define servo bit centerlines offset by distances −d4, −d5, and −d6 with respect to the track centerline CL, respectively.

When the read element 44 passes over a set of calibration bits, the electronic circuits 30 will generate a demodulated PES signal which has an amplitude that correlates to the location of the pair of calibration bits relative to the centerline of the track. The PES signal will have a larger voltage amplitude for calibration bits that are located farther away from the track centerline.

In operation, the heads are moved to the dedicated calibration track and centered on the track centerline CL using the servo bits A and B. The read element 44 then reads the calibration bits 50–60. Corresponding demodulated PES signals are then generated from the calibration bits and stored in a memory device of the disk drive. The various calibration points are interpolated to create the PES voltage v. track distance curve shown in FIG. 4. Although 6 sets of calibration bits are shown and described, it is to be understood that any number of bits can be used to generate enough data points to create a PES voltage v. track distance curve. The disk drive typically goes through the routine of generating the curve after each "power-on" sequence of the drive. Alternatively, the curve can be generated when the disk drive is initially assembled and then stored in a non-volatile memory medium such as the disk 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A disk for use in a hard disk drive, comprising:

a plurality of tracks, each track having a centerline;

said plurality of tracks including a calibration track having:

a first calibration bit pair having a first common boundary aligned with said centerline of said calibration track wherein first calibration bit pair is used for centering a transducer on said calibration track;

a second calibration bit pair having a second common boundary that is substantially halfway between said centerline of said calibration track and said centerline of a first adjacent track and that is substantially parallel with said centerline of said calibration track;

at least one third calibration bit pair, separate from said first and said second calibration bit pairs, having a third common boundary that is between said centerline of said calibration track and said second common boundary and that is substantially parallel to said centerline of said calibration track; and a first servo region, separate from said first, second and third calibration bit pairs, including a plurality of standard servo fields;

wherein said at least one third calibration bit pair includes a plurality of calibration bit pairs, each bit pair in said plurality having a common boundary located a predetermined distance from said calibration track centerline between said centerline and said second common boundary, wherein said predetermined distance for each calibration bit pair is different from the predetermined distance of at least one other calibration bit pair in said plurality of calibration bit pairs.

2. The disk as recited in claim 1, wherein said disk is adapted for use in an embedded servo disk drive system.

3. The disk as recited in claim 1, wherein said first calibration bit pair is used for centering a transducer on said calibration track.

4. The disk as recited in claim 3, wherein said first calibration bit pair includes an A bit and a B bit.

5. The disk as recited in claim 1, wherein said at least one third calibration bit pair includes a plurality of calibration bit pairs, each bit pair in said plurality having a common boundary located a predetermined distance from said calibration track centerline between said centerline and said second common boundary, wherein said predetermined distance for each calibration bit pair is different from the predetermined distance of at least one other calibration bit pair in said plurality of calibration bit pairs.

6. The disk as recited in claim 5, wherein:
said plurality of calibration bit pairs is used to create a nonlinear voltage versus track distance curve for use in compensating for an offset between a read element and a write element of a dual element head while said head is being positioned over a track of said disk.

7. The disk as recited in claim 1, wherein:
said second calibration bit pair includes a C bit and a first D bit.

8. The disk as recited in claim 1, further including:
a fourth calibration bit pair having a fourth common boundary that is substantially halfway between said centerline of said calibration track and a centerline of a second adjacent track and that is substantially parallel to said centerline of said calibration track, wherein said second adjacent track is on an opposite side of said calibration track from said first adjacent track.

9. The disk as recited in claim 1, wherein said first servo region includes an AGC field for use in setting the gain of a read channel, an ID field for use in identifying a corresponding sector of said calibration track, and a SYNC field for synchronizing a system check to facilitate reading of said calibration track.

10. A hard disk drive, comprising:
a housing;
a spin motor mounted to said housing;
a disk attached to said spin motor, said disk having a first disk surface including a plurality of tracks that each have a centerline, said plurality of tracks including a plurality of data tracks that each include both data sectors and servo sectors and a calibration track having at least three off-track calibration bit pairs, each of said at least three off-track calibration bit pairs having a common boundary located at a substantially different predetermined distance from said calibration track centerline than the other of said at least three off-track calibration bit pairs, wherein the predetermined distance is not zero, and an on-track calibration bit pair having a common boundary which is located at said calibration track centerline;
a rotary actuator arm mounted to said housing;
a head mounted to said rotary actuator arm for reading/writing data from/to a track of said disk, said head including a magnetoresistive read element and a separate write element, wherein said magnetoresistive read element is laterally offset from said write element relative to said centerline of said track;
means for positioning said head above a predetermined track of said first disk surface of said disk in response to a request from an exterior environment, said means for positioning utilizing servo information from said first disk surface of said disk and no servo information from any other disk surface in said disk drive to position said head above said first disk surface; and
means for compensating for head positioning errors caused, in part, by said offset between said magnetoresistive read element and said write element, said means for compensating using said at least three calibration bit pairs;
wherein said predetermined distance associated with each of said at least three off-track calibration bit pairs is no greater than the distance between the calibration track centerline and a point halfway between the calibration track centerline and an adjacent track centerline.

11. The disk drive as recited in claim 10, wherein said means for compensating includes means for creating a calibration table using said at least three calibration bit pairs.

12. The disk drive as recited in claim 10, wherein said means for compensating includes means for determining voltages associated with each of said at least three calibration bit pairs by centering said magnetoresistive read element of said head on said center line of said calibration track using said on-track calibration bit pair and reading said at least three off-track calibration bit pairs using said centered head.

13. The disk drive as recited in claim 12, wherein said voltages associated with said at least three calibration bit pairs are nonlinearly related to said corresponding off-track distances.

14. The disk drive as recited in claim 10, wherein said predetermined distance associated with each of said at least three off-track calibration bit pairs is no greater than one half track spacing.

15. The disk drive as recited in claim 11, wherein said means for creating a calibration table reads each calibration bit in said at least three calibration bit pairs only once to create said calibration table.

16. A hard disk drive, comprising:
a disk having a plurality of concentric tracks;
a spin motor for rotating said disk about an axis;
transducer means for reading information from a track of said disk as said disk rotates about said axis;
actuator means for changing the position of said transducer means relative to said disk in response to a signal;
said disk including a calibration pattern stored on a first of said tracks, said calibration pattern including:
a first calibration bit pair having a first common boundary aligned with said centerline of said first track for use in centering said transducer means on said first track; and
a plurality of second calibration bit pairs for use in creating a nonlinear calibration table, wherein each second calibration bit pair is different from said first calibration bit pair and each includes a common boundary that is located at a distance from a centerline of said first track that is less than a distance between the centerline after first track and a point halfway between the centerline of the first track and a centerline of an adjacent track and non-zero;
wherein said plurality of second calibration bit pairs includes at least three pairs, each pair having a common boundary located at a discrete off-track position that is different from the off-track positions of the other pairs, wherein each of said common boundaries can be sensed by said transducer means while centered on said first track to produce a unique voltage corresponding to said common boundary.

17. The disk drive, as claimed in claim 16, further comprising:
means for generating a nonlinear calibration table by reading said plurality of second calibration bit pairs while said transducer means is centered on said first track and recording resulting voltage values as a function of the off-track distance of corresponding second calibration bit pairs.

18. The disk drive, as claimed in claim 17, wherein:

said plurality of second calibration bit pairs includes at least three pairs, each pair having a common boundary located at a discrete off-track position, wherein each of said common boundaries can be sensed by said transducer means while centered on said first track to produce a unique voltage corresponding to said common boundary.

19. The disk drive, as claimed in claim 18, further comprising:

means for plotting each of said un e voltages against a corresponding discrete off-track position to create a plurality of points.

20. The disk drive, as claimed in claim 19, further comprising:

means for creating a nonlinear curve using said plurality of points.

21. The disk drive, as claimed in claim 20, wherein:

said means for creating includes means for interpolating between points in said plurality of points.

22. The disk drive, as claimed in claim 20, wherein:

said means for creating creates said curve during each power-on sequence of the system.

23. The disk drive, as claimed in claim 17, wherein:

said transducer means includes a write element and a magnetoresistive read element, wherein said write element is laterally offset from said read element with respect to a track of said disk.

24. The disk drive, as claimed in claim 23, further comprising:

means for compensating for transducer positioning errors caused by said offset between said write element and said magnetoresistive read element using said nonlinear calibration table.

* * * * *

UNITED STATES PATENT AND TRADEMARK OFFICE
CERTIFICATE OF CORRECTION

PATENT NO. : 5,867,353
DATED : February 2, 1999
INVENTOR(S) : Valent

It is certified that error appears in the above-identified patent and that said Letters Patent is hereby corrected as shown below:

In Claim 16 at column 6, line 51, the word "after" should be deleted and the words --of the-- should be substituted therefor.

In Claim 19 at column 7, line 14, the letters "un e" should be deleted and the word --unique-- should be substituted therefor.

Signed and Sealed this

Tenth Day of August, 1999

Q. TODD DICKINSON

*Attest:*

*Attesting Officer*

*Acting Commissioner of Patents and Trademarks*